United States Patent
Thakur et al.

(10) Patent No.: US 8,290,838 B1
(45) Date of Patent: Oct. 16, 2012

(54) INDICATING IRREGULARITIES IN ONLINE FINANCIAL TRANSACTIONS

(75) Inventors: Aman Thakur, Bangalore (IN); Jeffrey A. Hughes, Woodinville, WA (US); Sanjay Suri, New Delhi (IN)

(73) Assignee: Amazon Technologies, Inc., Reno, NV (US)

( * ) Notice: Subject to any disclaimer, the term of this patent is extended or adjusted under 35 U.S.C. 154(b) by 517 days.

(21) Appl. No.: 11/694,613

(22) Filed: Mar. 30, 2007

Related U.S. Application Data

(60) Provisional application No. 60/882,795, filed on Dec. 29, 2006.

(51) Int. Cl.
*G06Q 40/00* (2012.01)
(52) U.S. Cl. .......................................... 705/35; 705/37
(58) Field of Classification Search .................. None
See application file for complete search history.

(56) References Cited

U.S. PATENT DOCUMENTS

| | | | | |
|---|---|---|---|---|
| 5,649,118 | A * | 7/1997 | Carlisle et al. | 705/41 |
| 5,819,226 | A * | 10/1998 | Gopinathan et al. | 705/44 |
| 6,330,546 | B1 * | 12/2001 | Gopinathan et al. | 705/35 |
| 6,714,918 | B2 * | 3/2004 | Deshpande et al. | 705/18 |
| 7,263,506 | B2 * | 8/2007 | Lee et al. | 705/38 |

OTHER PUBLICATIONS

Al Hartgaves. Andersen's Role in Enron's Failure. Emory University, Atlanta, GA 30322 (2004).*

* cited by examiner

*Primary Examiner* — Muriel Tinkler
(74) *Attorney, Agent, or Firm* — Lee & Hayes, PLLC

(57) ABSTRACT

A system and method for preventing fraud in an online transaction is shown. Requests for financial transactions between on-line account holders are detected as well as relationships between the accounts. A fraud value related to a likelihood that a fraud is occurring in the transactions is determined based on the relationship. An indication of a likelihood of fraud is provided if the fraud value exceeds a predetermined amount. Thus the transaction is terminated and the appropriate parties are automatically notified.

23 Claims, 4 Drawing Sheets

INDICATING IRREGULARITIES IN ONLINE FINANCIAL TRANSACTIONS

CROSS REFERENCE TO RELATED MATTERS

This application claims benefit of U.S. provisional application No. 60/882,795 filed on Dec. 29, 2006.

BACKGROUND

Consumers and merchants use the electronic marketplace to buy and sell products. The electronic marketplace may typically include an electronic commerce center that is connected via the internet to consumers and merchants. Each would establish an on-line account with the center and may transact business via the center for the purchase and sales of goods.

Unfortunately, unscrupulous individuals have used the center to conduct fraud. For example, such individuals might set up multiple accounts under fictitious names with the center. Such individuals might then obtain a stolen credit card to purchase goods from a merchant using a first account while simultaneously using a separate account to sell the same goods to the consumer. The unscrupulous individual may transfer the funds received from the purchase of the goods to another account and never deliver the goods. The same individual may also accept delivery on the goods and be unavailable before the merchant becomes aware that the goods were purchased with a stolen credit card.

Accordingly there continues to be a need for reducing fraud in the electronic marketplace.

SUMMARY

An electronic commerce center establishes on-line accounts for consumers and merchants on its system. The center includes a tool that detects requests for financial transactions between consumers, merchants, and account holders in an effort to determine what, if any, relationship might exist between various financial transactions. For instance, the tool might detect a request for a financial transaction between a consumer and a holder of one account, and subsequently detect a financial transaction between a merchant and a holder of another account. In response to the two requests, the tool might then determine what relationship exists between the two financial transactions even though different parties are involved.

Once a relationship is determined to exist between accounts involved in financial transactions, the tool could link the accounts. A fraud value could be computed from common records and/or attributes of the linked accounts. The tool could provide an indication of a likelihood of fraud if the fraud value exceeds a predetermined threshold value computed based on statistics of prior transactions and on the risk of the transactions being fraudulent. In response to the indication, the financial transactions could be terminated or pushed to a human investigation queue to determine if the transaction should be allowed to occur.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical items.

DETAILED DESCRIPTION

Figure 1:
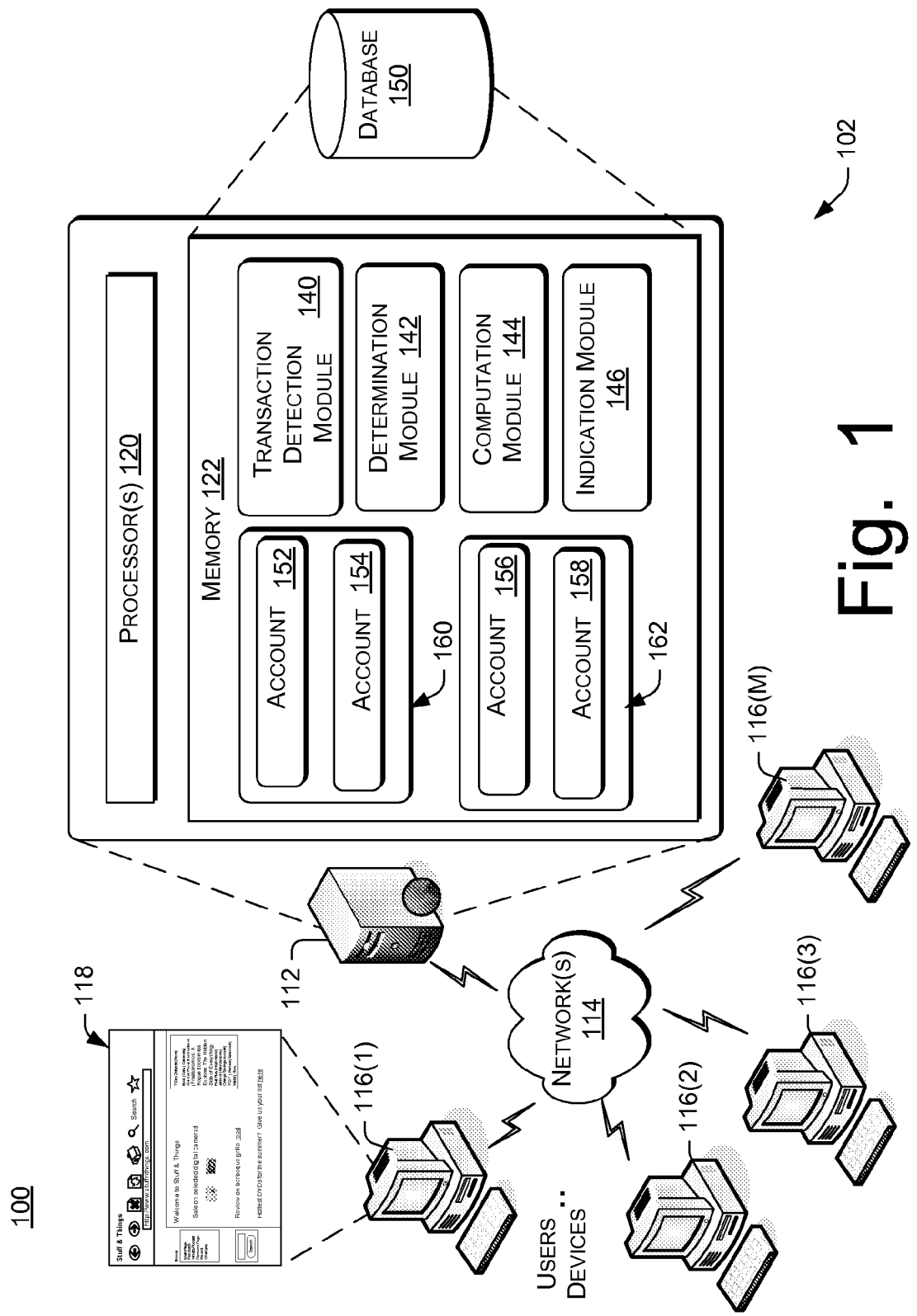
FIG. 1 shows an exemplary architecture for implementing a system for indicating irregularities in online financial transactions, including a server-based electronic commerce center networked to a plurality of user devices.

This disclosure is directed to electronic market places accessible via a network, such as the Internet. Such marketplaces are often called e-commerce or merchant websites and, in the case of the Internet, are located at various domains across the World Wide Web. In particular, the following discussion pertains to electronic commerce centers that are used in the electronic market place.

In one embodiment, a tool application is provided that could be used by the commerce center to detect fraud in financial transactions. Fraud can be difficult to detect when parties to the transaction use aliases or multiple accounts to complete the transaction. So the tool tracks the financial transactions and tries to discover links between the transactions.

For example, the tool could detect requests for financial transactions between a multiple accounts. In response to these requests, the tool could examine the accounts involved in the transactions, determine whether or not a relationship exists between the accounts and determine the extent of the relationship. Also the tool could determine which common records of the accounts are to be involved in both financial transactions, e.g. do both transactions have accounts with a common credit card, license, e-mail address, IP address, or cookie.

If a relationship exists, the tool could link the accounts (i.e., note that the accounts are related) and compute a fraud value. The fraud value could be determined by first computing a point value for each record and/or an attribute of the linked account. This point value would be based on statistics of prior transactions. For example, the point value for one record/attribute could be a high number if that one record/attribute is present in many fraudulent transactions. The point value could be a low number if that one record/attribute is rarely present in prior fraudulent transactions. The tool could add the point values for the common records and/or attributes to determine the fraud value.

A predetermined threshold value is computed by the tool or another computing device. This value could be related to records and/or attributes of similar accounts, and that transactions with accounts containing certain attributes and/or records in similar prior transactions were fraudulent. The tool could provide an indication of a likelihood of fraud if the fraud value exceeds the predetermined threshold value. In response to the indication, the financial transactions could be terminated or pushed to a human investigation queue to determine if the transaction should be allowed to occur. By the tool performing the foregoing, the likelihood of fraudulent transactions occurring is reduced.

For purposes of discussion, a tool running in an electronic commerce center is described in the following exemplary environment in which items are offered for sale. However, it should be appreciated that such a tool may be implemented in other environments, including ones in which services serve as a revenue model rather than item sales.

Example System Architecture

Illustrated in FIG. 1 there shows system 100 that includes an electronic commerce center 102 having a tool that is used for monitoring irregularities in online transactions. This system 100 includes a server 112 coupled via network 114 to computing devices 116 (1-M), examples of which include buyer computing device 116(1), seller computing device 116(2), second buyer computing device 116(3), and second seller computing device 116(M). Although four computing devices 116 (1-M) are shown, the system 100 can be expanded to add more computing devices and is not limited to four devices.

The computing devices (116(1)-116(M)) represent any kind of electronic unit which can interact with the server 112 via the network 114 (discussed below). In the most common case, the devices (116(1)-116(M)) correspond to computer devices, such as personal computers, laptop computers, and so forth. But any of the devices (116(1)-116(M)) corresponds to any kind of wearable computer, a mobile telephone, a Personal Digital Assistant (PDA) device, a stylus-type input device, a game console device, and so forth. In any event, a device, such as exemplary device 116(1), can comprise a processing unit (not shown) and a presentation unit (not shown). The processing unit generally corresponds to functionality (e.g., software logic, and/or circuitry, etc.) for processing information. The presentation unit generally corresponds to functionality (e.g., software logic, and/or circuitry, etc.) for presenting the processed information. For example, the presentation unit can present a graphical user interface 118 for interacting with a user.

The network 114 can correspond to any kind of communication conduit or combination of communication conduits. In the case most commonly evoked in this disclosure, the network 114 corresponds to a wide area network, such as the Internet. However, network 114 can alternatively, or in addition, comprise other kinds of communication conduits, such as an intranet, point-to-point coupling arrangement, and so forth. In any case, the network 114 can include any combination of hardwired links, wireless links, routers, repeaters, gateways, name servers, and so forth (not shown), governed by any protocol or combination of protocols.

Server 112 includes one or more processor(s) 120 and memory 122. The memory 122 includes a computer readable media in the form of volatile memory, such as random access memory (RAM), and/or non-volatile memory, such as read only memory (ROM). In other embodiments, memory 122 includes other removable/non-removable, volatile/non-volatile computer storage media. By way of example, memory 122 includes a hard disk drive for reading from and writing to a non-removable, non-volatile magnetic media (not shown), a magnetic disk drive, a removable, non-volatile magnetic disk (e.g., a "floppy disk"), and an optical disk drive. The disk drives and their associated computer-readable media provide non-volatile storage of computer readable instructions, data structures, program modules, and other data for the server 112. It is to be appreciated that other types of computer readable media which can store data that is accessible by a computer can be used as a memory.

Stored in memory 122 is the tool that includes transaction detection module 140, determination module 142, computation module 144 and indication module 146. Memory 122, in one embodiment, includes a database 150 in which user accounts 152-158 are stored. Accounts 152-158 comprise user account records (See FIG. 2), examples of which include, but is not limited to, user credit card numbers, user names, user addresses, driver licenses numbers, user preferences, cookie information and other user metadata. Accounts 152 and 154 respectively are updated with information from a user of buyer computing device 116(1), and seller computing device 116(2). Accounts 156 and 158 respectively receive information from a user of buyer computing device 116(3), and seller computing device 116(M). A predetermined point value for each of the account records is stored in database 150. These predetermined point values indicate the probability that an identical account record, when simultaneously used by more than one account as part of a financial transaction, is involved in a fraudulent transaction. The predetermined point values are computed from the account records and attributes of the accounts. Further details of determining the predetermined point values are explained in FIG. 4. In one embodiment, "Simultaneously" is defined to mean substantially at the same time, or within a predetermined period after a first event.

Virtual transaction modules 160 and 162 are shown to illustrate the accounts involved in a single financial transaction. The virtual transaction modules 160 and 162 are created when a financial transaction is detected, with appropriate account data being placed therein. The virtual transaction modules are deleted once the financial transaction is completed. Transaction detection module 140 retrieves account information from the various accounts maintained in virtual transaction modules 160 and 162. Transaction module 140 detects requests for a financial transaction (such as a request for a purchase or sale of one or more products) initiated between buyer computing device 116(1) and seller computing device 116(2) upon such devices respectively accessing accounts 152 and accounts 154. Transaction detection module 140 likewise detects requests for a financial transaction initiated between buyer computing device 116(3) and seller computing device 116(M) upon such devices respectively accessing accounts 156 and accounts 158. Transaction detection module 140 facilitates financial transactions between the buyer and seller of products.

Determination module 142 receives an indication from transaction detection module 140 that a request for a financial transaction has been submitted by the users of one or more of accounts 152-154. In response to the indication, determination module 142 determines whether a relationship exists and the extent of the relationship between the various accounts 152-158 and whether similar records of those accounts are simultaneously involved in multiple financial transactions. For example, a user associated with buyer device 116(1) and a holder of account 152 could request a purchase from seller device 116(2) and holder of account 154 while simultaneously a user associated with buyer device 116(3) and holder of account 156 requests a purchase from seller 116(M) and holder of account 158. Using account linking and examining the account records, determination module 142 determines if the holder of account 154 and the holder of account 156 were likely the same user. In other words, determination module 142 links the accounts by determining the common records for each of accounts 152-158.

Figure 2:
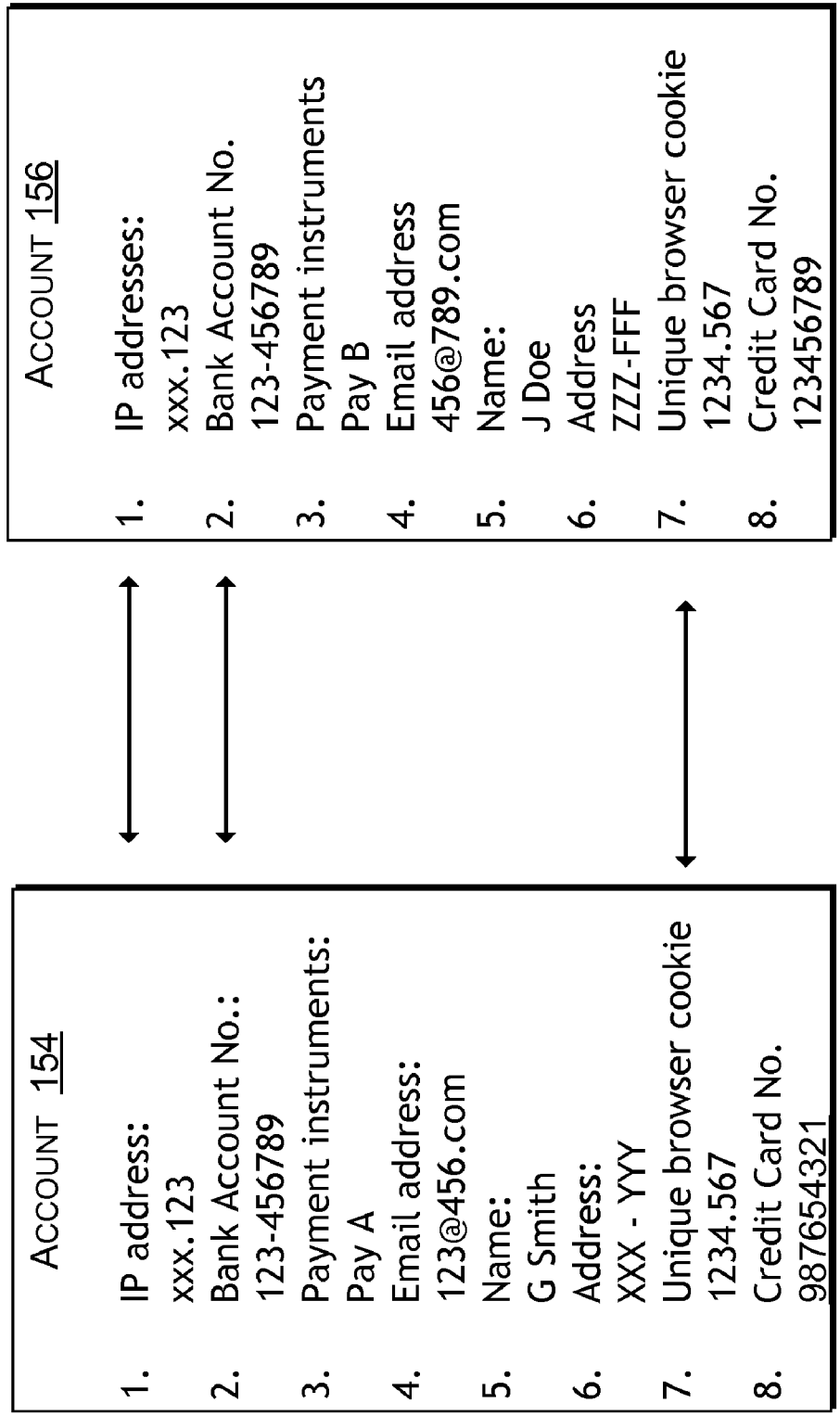
FIG. 2 shows exemplary records of accounts involved in separate financial transactions shown in FIG. 1.

Illustrated in FIG. 2 are exemplary records of account 154 and account 156 shown in FIG. 1. These exemplary records are as follows: IP address, bank account number, browser cookies, payment instructions, e-mail address, account name, account address, unique browser cookie, and credit card number.

Determination module 142 could examine the records for accounts 154 and 156 and determine the existence of common records. In FIG. 2, for example, accounts 154 and account 156 could be linked as they have the same IP address, unique browser cookie, and bank account number. Although not shown, other records that could be stored in the accounts include the account holder drivers' license number, or the account holder's shipping address.

Referring to FIG. 1, determination module 142 could also determine attributes of the requested transaction. Specifically, determination module 142 could determine for each transaction a score, a velocity limit, a velocity balance, a transaction rate or a history of a last predetermined number of transactions.

If determination module 142 detects common records between the accounts that are involved in simultaneous financial transactions, determination module 142 provides an indication to computation module 144 that a relationship exists between the various accounts. For example, determination module 142 could determine if devices 116(2) and 116(3) were being used by the same user.

Using the predetermined point values stored in a table in database 150, computation module 144 computes a fraud value related to a probability or likelihood that fraud is occurring in a financial transaction. The fraud value also is computed by computational module 144 summing predetermined point values for account records containing common attributes of the accounts 152-158 themselves. This fraud value is determined by adding together a predetermined point value for each of the common records of the accounts previously stored in the database 150. The predetermined point values could be based on prior transactions in which common records were present in fraudulent transactions. Further details of determining the pre-determined point value for each record and/or attribute is described in FIG. 4.

Indication module 146 indicates a likelihood of fraud if the computed fraud value exceeds a pre-determined threshold value or if the fraud value is within a pre-determined range of values. Exemplary details for determining the pre-determined threshold value are described in FIG. 4. Further indication module 146 provides an indication to an administrator or human investigation queue to determine if such fraud value is outside a pre-determined range or exceeds a pre-determined value. The administrator reviews transaction and fraud values to determine if the transaction should be allowed to occur or should be terminated. The administrator may then provide a termination indication to indication module 146 via an administration interface.

If a transaction is to be terminated, indication module 146 then automatically or in response to the administrator, provides an indication that is used by transaction module 140. The indication indicates that certain accounts are linked or that the accounts are likely involved in a fraudulent transaction. Indication module 146 then prevents the completion of the financial transactions involving the suspected fraudulent accounts.

Although two buyers and sellers are illustrated in FIG. 1, the server is coupled through network 114 to multiple buyers and sellers, each having multiple accounts. Such accounts likewise are monitored by modules 140-146 to detect relationships between the accounts and compute fraud values related to a probability that a fraud is be occurring between the two accounts involved in simultaneous financial transactions. The fraud value is described for example as being determined between multiple accounts upon a request for financial transactions. Such fraud values or relationships between the accounts are determined or established when accounts 152-158 are created.

Exemplary Process

Figure 3:
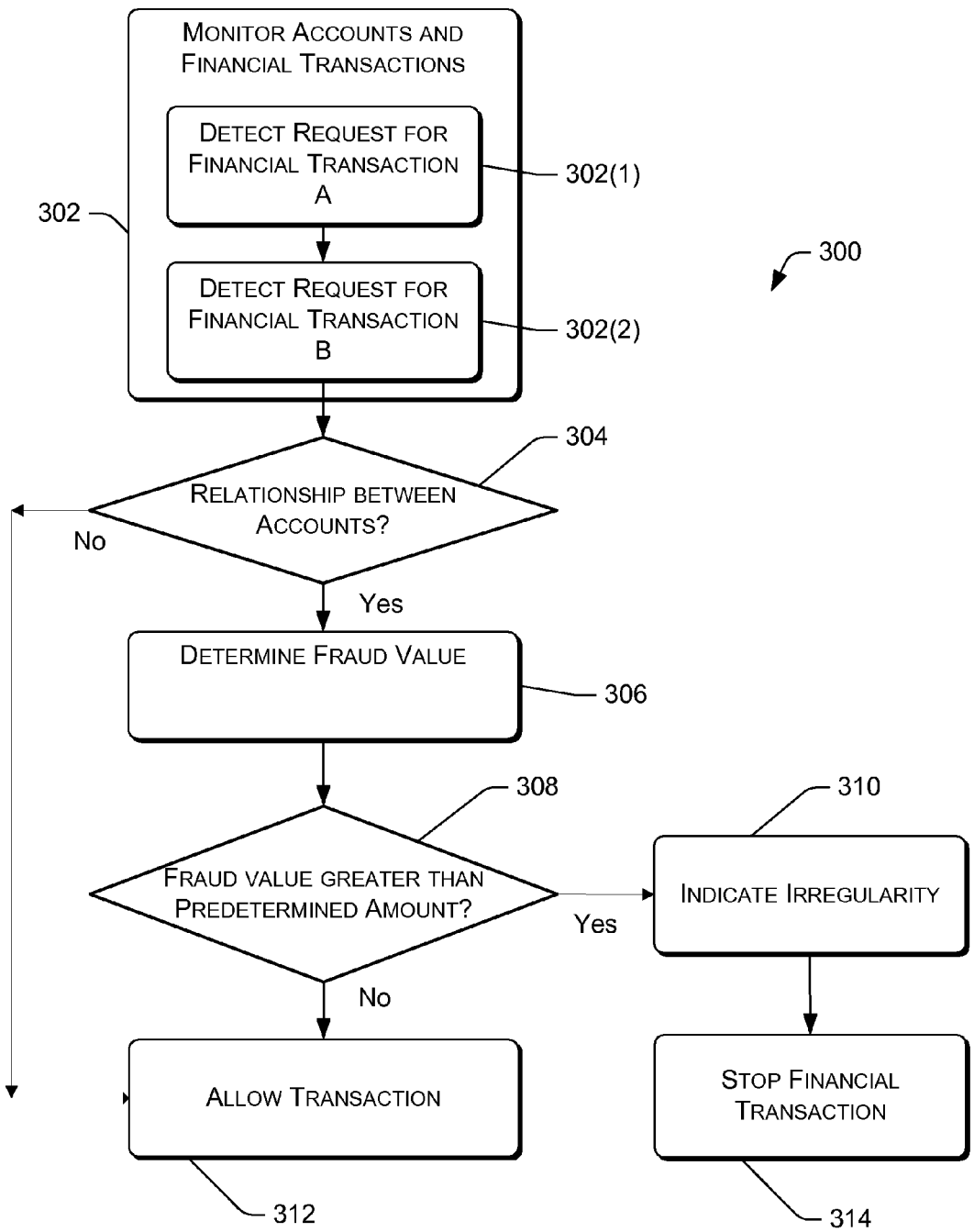
FIG. 3 shows a flow diagram of a process for indicating irregularities in online financial transactions with a tool application in an electronic commerce center.

FIG. 3 illustrates an example process 300 executed by the tool for detecting and indicating irregularities in online financial transactions with electronic commerce center 102. The process is illustrated as a collection of blocks in a logical flow graph, which represent a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process.

For discussion purposes, the process is described with reference to the system 100 of FIG. 1, although it may be implemented in other architectures. Process 300 is executed by processor(s) 120 within server 112. In block 302, accounts and financial transactions are monitored. For discussion purposes, suppose that two transactions are detected while being monitored as represented by blocks 302(1)-(2). In block 302(1), a request for a first financial transaction (financial transaction A) between a buyer computing device 116(1) (FIG. 1) using account 152 and a seller computing device 116(2) using account 154 is detected by transaction detection module 140. In block 302(2), a request for a second financial transaction (financial transaction B) between buyer computing device 116(3) and seller computing device 116(M) using accounts 156 and 158, respectively, is likewise detected by transaction detection module 140. Although two transactions are shown, transaction module 140 could also monitor additional financial transactions.

A determination is made at block 304, as to whether a relationship exists between accounts 154 and accounts 156. A determination is also made as to whether a relationship exists between any of the other accounts in which a transaction is simultaneously occurring while a financial transaction is taking place between accounts 152-158. This relationship is determined by examining whether or not there are commonalities between records in accounts simultaneously involved in separate financial transactions. Examples of account records that are examined for commonalities include, for example, the IP address of the computing device, the cookies of the browser of the computing device, the payment instructions provided by the computing device or provided with the accounts, the e-mail address of the computing device, the name on the account, the credit card number used in the account or to open up the account, the bank account number used in the account or to open up the account or the shipping address for the account.

If there are no relationships detected between any of the accounts involved in simultaneously occurring financial transactions (i.e. "no" to block 304), the financial transactions betweens the various accounts are allowed to be completed in block 312. On the other hand, if a relationship exists between accounts (i.e. "yes" to block 304), module 142 determines the fraud value in block 306.

In one embodiment a fraud value is determined in block 306 based on account attributes and/or the common account records. Such account attributes are stored in database 150. Examples of these account attributes include a score (a number for that account that is updated every time the account is used in a transaction and whether the account is likely to be involved in a fraud), a velocity limit (the number of times the account is expected to be used within a predetermined time period), a velocity balance (the number of times an account is used within a predetermined time period), a transaction rate (the number of transactions within the past day) or a history of a last predetermined number of transactions. These attributes are maintained on a per account basis. Further the attributes are aggregated to a group level which is done by running statistical models. A predetermined point value for the account attributes for the individual accounts involved in transactions having common records are added together to compute the fraud value. In another embodiment, predetermined point values are assigned to the common records, which are added together to determine the fraud value.

In block 308, the computed fraud value is compared against a predetermined fraud value. This predetermined fraud value is determined by reviewing the similar records between accounts and correlating such similarities against incidents of fraud or such other unwanted behavior. For example, if a high incidence of fraud occurs where the high velocity limit, common IP address, credit card number are common to the accounts involved in a fraud, the predetermined point value for these attributes is set to a large number. If these attributes are rare in fraudulent transactions, the predetermined fraud value for such attributes is set to a lower number. Further details for setting the predetermined point values are described in FIG. 4. If the fraud value is greater than or outside a predetermined range for fraud values ("yes" to block 308), then an irregularity would be indicated in block 310. If the fraud value is not greater the predetermined fraud value, or falls within a predetermined range ("no" to block 308), the financial transaction between accounts would be enabled in block 312 and be allowed to proceed.

In block 310, once an indication of an irregularity or likelihood of fraud is determined then indication module 146, in block 314, is accessed. Indication module 146 prevents the completion of the transaction between the accounts from occurring and terminates the transaction. Also indication module 146 provides an indication to an administrator that the likelihood of a fraud is occurring to enable the administrator to take the appropriate action.

Figure 4:
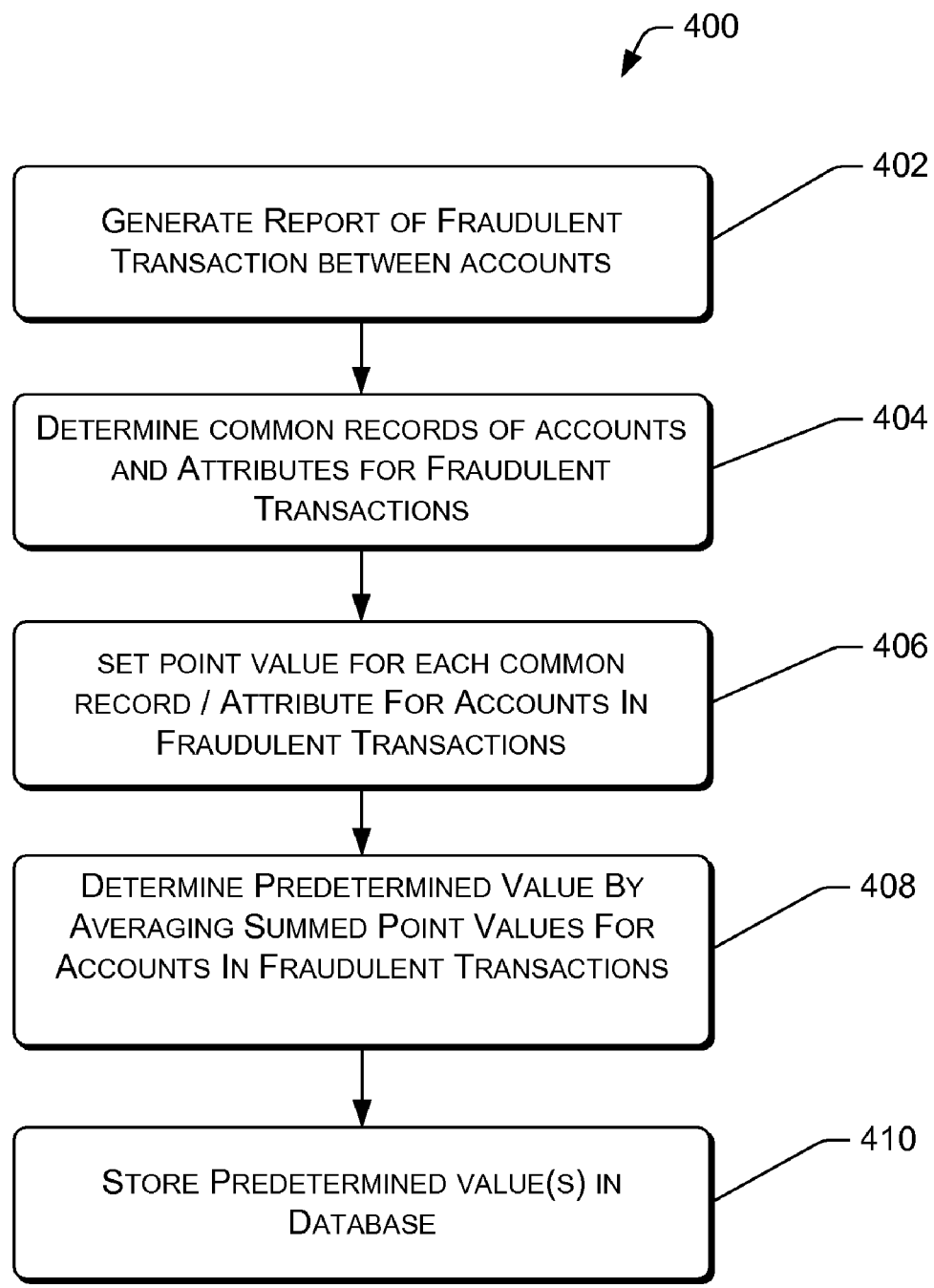
FIG. 4 shows a flow diagram of a process for determining fraud values and threshold values used in the process shown in FIG. 3.

FIG. 4 shows an exemplary process 400 used to determine the predetermined point values used in implementing the various aspects of the fraud detection methods shown in FIG. 1 and FIG. 3. This process is be used by the server 112 (or by any computing device) prior to any individual account creation, and the results of the process is updated periodically as more information concerning fraudulent transactions becomes available.

In block 402, reports of fraudulent transactions between accounts are generated by server 112 and stored in database 150. These reports include all the records (as previously described) of accounts involved in fraudulent transactions and the account's attributes. For example server 112 receives information indicating that a fraud occurred between exemplary accounts A and B (not shown), and the records in common to both accounts.

In block 404, the server 112 determines which records are common to accounts involved in fraudulent transfers and which attributes are present in financial transactions involving an account. For example using exemplary accounts A and B that were involved in a fraudulent transaction, the server 112 determines that these accounts had a common IP address, unique browser cookies and bank account number. Using exemplary accounts C and D (not shown) that were also involved in a fraudulent transaction, the server 112 determines that these accounts had a common IP address, e-mail address and unique browser cookie.

In block 406, the server assigns an initial point value to each record depending on the frequency of such records occurrence in a fraudulent transaction. The point value is assigned such that records having a higher frequency of occurrence in a fraudulent transaction receiving a higher predetermined point value. The server 112 also assigns an initial point value to each attribute for each account; with the attributes having a higher frequency occurrence in a fraudulent transaction likewise receiving a higher predetermined point value. Using exemplary accounts A and B, the server 112 assigns an initial point value of 1 to the IP address, unique browser cookies and bank account number. Using exemplary accounts C and D, server 112 assigns an initial point value of 1 to the IP address, e-mail address and unique browser cookie.

In block 408, the server 112 determines a predetermined value for each record by first determining a point value equal to an average and/or mean of the sum of the initial point values for each of the records and/or attributes of those accounts involved in a fraudulent transaction. For example using exemplary accounts A-D, the server assigns a point value of 1 to the IP address, and unique browser cookie record, and assigns a point value of 0.5 to the bank account number and e-mail address record. In an alternate embodiment, the server 112 also determines a standard deviation of the initial point values, and set the predetermined point value at the point value plus or minus a percentage of the standard deviation (or another constant value) of the initial point values depending on a transaction risk analysis and the availability of administrators to examine an account suspected of fraud or irregularities. In block 410, the predetermined point values are be stored in database 150 (FIG. 1) with its corresponding account(s).

CONCLUSION

In closing, although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

The invention claimed is:
1. A computer-implemented method, comprising:
detecting a first pending request, from a first account, for a first online financial transaction at a first point in time;
detecting a second pending request, from a second account lacking an association with the first account, for a second online financial transaction at a second point in time;
responsive to detecting the first pending request and the second pending request, determining that the first point in time and the second point in time are within a threshold period of time and whether one or more relationships exist between the first account and the second account by matching records that are common between the first account and the second account; and
if one or more relationships exist,
computing, using one or more processors, a fraud value based at least in part on predetermined point values of account attributes for each of the first account involved in the first pending request and the second account involved in the second pending request; and
providing an indication if the fraud value exceeds a predetermined threshold value, the indication to initiate a denial of at least one of the first pending request for the first online financial transaction or the second pending request for the second online financial transaction or to initiate human inspection of details of the first account and the second account.

2. The method of claim 1 further comprising preventing the completion of at least one of the first online financial transaction or the second online financial transaction if the fraud value is within a predetermined range.

3. The method of claim 2 wherein the predetermined range is determined based on analyzing prior financial transactions.

4. The method of claim 1 wherein the computing the fraud value comprises selecting one or more of the records common to the first account and the second account, and wherein a record is selected from a group of records comprising: IP address, browser cookies, payment instructions, or e-mail address.

5. The method of claim 1 wherein the first account and the second account are managed by a common server.

6. The method of claim 1 wherein the one or more relationships between the first account and the second account are determined as a result of detecting the first pending request for the first online financial transaction and detecting the second pending request for the second online financial transaction.

7. The method of claim 1 wherein the computing the fraud value includes examining an attribute of the first account and the second account, wherein the attribute is selected from a group of attributes comprising: a score, a velocity limit, a velocity balance, a transaction rate or a history of a last predetermined number of transactions.

8. A computer readable storage medium comprising computer-executable instructions that, when executed by one or more processors, cause the one or more processors to perform acts comprising:
   detecting requests for two different online financial transactions involving multiple unlinked online accounts, a first of the two different online financial transactions buying one or more items and a second of the two different online financial transactions selling the one or more items;
   responsive to detecting the requests, determining if one or more relationships exists between the multiple unlinked online accounts by identifying records that are common between the multiple unlinked online accounts; and
   if one or more relationships is determined to exist between the multiple unlinked online accounts:
      providing an indication that the multiple unlinked online accounts involved in the two different online financial transactions are fraudulently linked, and
      preventing a completion of at least one of the two different online financial transactions.

9. The computer readable medium of claim 8 wherein the preventing the completion of the at least one of the two different online financial transactions occurs upon identifying records having the one or more relationships involving the multiple unlinked online accounts, wherein the records are selected from a group comprising: IP address, browser cookies, payment instruction, or e-mail address.

10. The computer readable medium of claim 9 wherein preventing the completion of the at least one of the two different online financial transactions further comprises examining one or more attributes of the multiple unlinked online accounts, wherein the one or more attributes are selected from a group of attributes comprising: a score, a velocity limit, a velocity balance, a transaction rate or a history of a last predetermined number of transactions; and determining when point values created from the one or more attributes exceed a predetermined threshold.

11. A system for monitoring online financial transactions with multiple online accounts, comprising:
   one or more processors;
   a memory, accessible by the one or more processors;
   multiple accounts stored in the memory, the multiple accounts being free of an association with one another in the memory;
   one or more transaction modules to detect a first request for a first online financial transaction involving a first of the multiple accounts, and to detect a second request for a second online financial transaction involving a second of the multiple accounts;
   a determination module to determine, responsive to the detection of the first and second requests, whether:
      the first request and the second request are concurrently pending; and
      one or more relationships exist between the first and second accounts and, if one or more relationships exist between the first and second accounts, determine an extent of the one or more relationships;
   a computation module to assign a value related to the extent of the one or more relationships if at least one relationship is determined to exist and the first request and the second request are concurrently pending, the value being based at least in part on an amount of account activity of one of the first and second accounts; and
   an indication module to provide an indication that the first and second accounts are fraudulently linked if the value exceeds a predetermined threshold.

12. The system as recited in claim 11 wherein the indication module prevents completion of at least one of the first or second online financial transactions if the value exceeds the predetermined threshold.

13. The system as recited in claim 11 further comprising a database stored in memory that comprises point values, wherein each of the point values correspond to a frequency that a record in an account is common to accounts previously involved in fraudulent transactions, and wherein the computation module assigns the value by adding the point values for each of the records for accounts having a relationship.

14. A computer readable storage medium comprising computer-executable instructions that, when executed by one or more processors, cause the one or more processors to perform acts comprising:
   detecting a first request for a first financial transaction between a holder of a first account and a first entity, wherein detecting the first request considers one or more purchase products that the holder of the first account requests to buy from the first entity;
   detecting a second request for a second financial transaction between a holder of a second account and a second entity, the second account being initially unassociated with the first account, wherein detecting the second request considers one or more sale products that the holder of the second account offers for sale to the second entity, the one or more sale products being similar to or the same as the one or more purchase products and the first request and the second requests are pending during an overlapping period of time;
   subsequent to detecting the first and second requests, identifying at least one relationship between the first account and the second account; and
   computing a fraud value after identification of the at least one relationship, the fraud value indicative of fraudulent activity in the first account or the second account, wherein the fraud value is generated by summing at least a first fraud score associated with the first account and a second fraud score associated with the second account.

15. A computer-implemented method, comprising:
- detecting a pending first financial transaction associated with a first account, the first financial transaction involving a request to sell one or more sale products;
- detecting a pending second financial transaction associated with a second account not linked to the first account at a time the pending second financial transaction is detected, the second financial transaction involving a request to purchase one or more purchase products similar to or the same as the one or more sale products;
- responsive to detecting the pending first financial transaction and the pending second financial transaction, determining whether at least one relationship between the first account and the second account exists; and
- if at least one relationship is determined to exist:
    - computing, using one or more processors, a fraud value using the determined relationship, the fraud value related to a likelihood that a fraud is occurring;
    - indicating the likelihood of fraud if the fraud value exceeds a predetermined value; and
    - linking the first account and the second account.

16. The method of claim 15 wherein the pending first financial transaction and the pending second financial transaction are pending during an overlapping period of time.

17. The method of claim 15 wherein the request to sell the one or more sale products and the request to purchase the one or more purchase products occur within a threshold time period.

18. The method of claim 15 further comprising preventing completion of the pending first financial transaction or the pending second financial transaction when there is an indication of a likelihood of fraud.

19. The method of claim 15 wherein determining whether at least one relationship exists comprises sensing records in the first account and the second account, at least one record from a group of records comprising: IP address, browser cookies, payment instructions, or e-mail address.

20. The method of claim 15 wherein the computing the fraud value includes determining a number of times an account is used and adjusting the fraud value based at least in part on the determined number of times the account is used.

21. The method of claim 15 wherein the fraud value is determined by examining one or more attributes of the first account or the second account, wherein the one or more attributes are selected from a group of attributes comprising: a velocity limit, a velocity balance, a transaction rate or a history of a last predetermined number of transactions.

22. The method recited in claim 15, wherein the computing of the fraud value includes aggregating individual scores associated with each of the first account and the second account, the individual scores indicating a likeliness that the respective account includes fraudulent activity.

23. The method recited in claim 15 further comprising transmitting a message to initiate a human inspection of account details of the first account and the second account after the fraud value is computed and exceeds the predetermined value.

* * * * *